United States Patent [19]

Lane

[11] 4,277,957
[45] Jul. 14, 1981

[54] SPLINE DRIVE ARRANGEMENTS
[75] Inventor: Jeffrey A. Lane, Olton, England
[73] Assignee: Lucas Industries Limited, Birmingham, England
[21] Appl. No.: 76,231
[22] Filed: Sep. 17, 1979
[30] Foreign Application Priority Data
Sep. 29, 1978 [GB] United Kingdom ............ 38799/78
[51] Int. Cl.³ .............................................. F16D 3/18
[52] U.S. Cl. .................................. 64/9 R; 64/27 NM
[58] Field of Search ................ 64/9 R, 14, 26, 1V, 64/30 C, 30 E, 27 NM; 74/409; 188/290

[56] References Cited
U.S. PATENT DOCUMENTS

| 2,975,620 | 3/1961 | Shipley et al. ............... 64/9 R |
| 3,408,830 | 11/1968 | Sutaruk et al. ............ 64/27 NM |
| 3,463,281 | 8/1969 | Aschauer ..................... 188/290 |
| 3,511,349 | 5/1970 | Herscovici ................... 64/30 C |
| 3,757,535 | 9/1973 | Stein ............................. 64/9 R |
| 4,046,030 | 9/1977 | Suzuki ...................... 64/27 NM |
| 4,204,413 | 5/1980 | Miller ........................ 64/30 E |

FOREIGN PATENT DOCUMENTS

| 2355433 | 11/1973 | Fed. Rep. of Germany ............ 64/9 R |
| 2825957 | 2/1979 | Fed. Rep. of Germany ............ 64/26 |
| 838188 | 6/1960 | United Kingdom . |
| 396497 | 1/1974 | U.S.S.R. ...................... 64/9 R |

Primary Examiner—Charles J. Myhre
Assistant Examiner—Magdalen Moy

[57] ABSTRACT

A spline drive arrangement comprises an internally-splined gear in driving engagement with two externally-splined shafts. An axial projection 18 on the shaft lies within a bore in the shaft, and elastomeric rings frictionally engage the projection and the bore and inhibit relative movement between these parts. Relative axial movement is also inhibited by a liquid-filled space defined with the bore by the end of the projection, liquid flow to and from this space being constrained to flow through a restricted passage.

3 Claims, 1 Drawing Figure

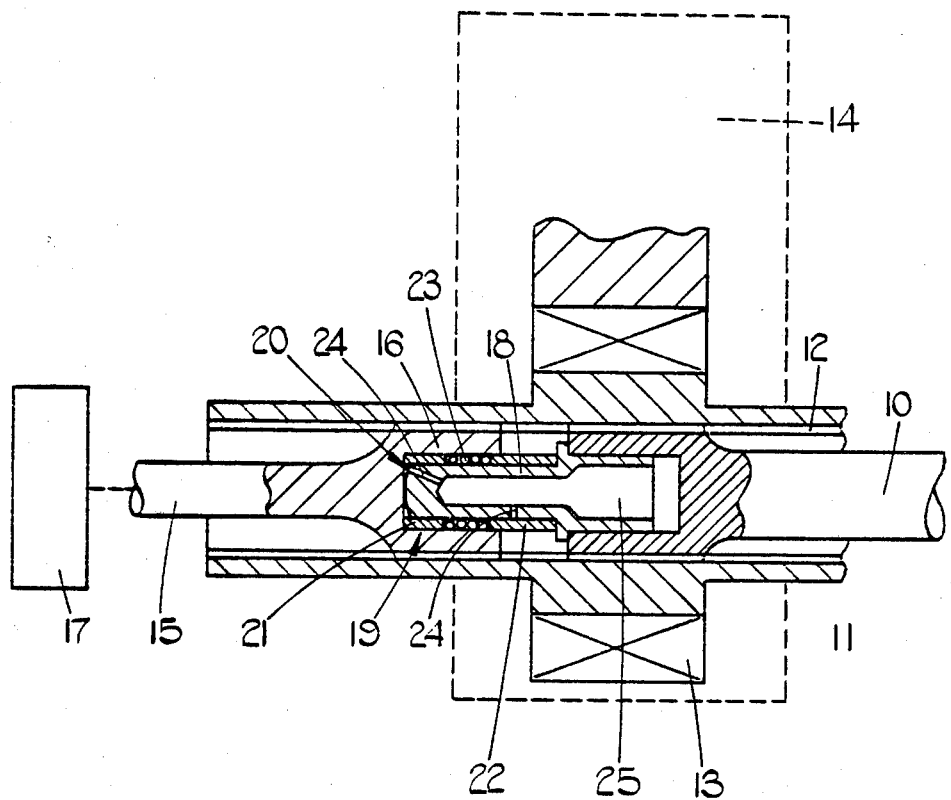

SPLINE DRIVE ARRANGEMENTS

This invention relates to spline drive arrangements.

There exists a requirement to provide a spline drive arrangement in which an internally splined member is in simultaneous driving connection with two externally splined members, and in which one of the driving connections is required to transmit a substantially higher torque than the other connection. In such an arrangement the circumferential force between the splined members at the higher torque driving connection is effective to prevent relative movement between these parts, but relative movement between the splined members at the lower torque driving connection may be sufficient to cause unacceptable wear at this latter connection.

It is an object of the invention to provide a spline drive arrangement of the type indicated, but in which the probability of relative movement between the splined members at a lower torque driving connection is substantially reduced.

According to the invention a spline drive arrangement includes an internally splined member in driving engagement with first and second axially aligned externally splined members, an axial projection on said first member, an axial bore in said second member, said bore surrounding said projection, and an annular elastomeric element surrounding said projection and frictionally engaging said projection and said bore.

An embodiment of the invention will now be described by way of example only, and with reference to the accompanying drawing.

An input shaft 10 has an externally splined end 11 which engages a splined bore 12 in a gear 13 which forms part of a gear pump, indicated generally at 14. A further shaft 15 also has a splined end 16 which engages the bore 12. The shaft 15 provides a driving connection to a centrifugal pump 17 which operates to supply liquid to the gear pump 14.

Projecting from the spline end 11 of the shaft 10 is a part 18 which engages the shaft 10 so as to rotate therewith. The spline end 16 of the shaft 15 is provided with a blind bore 19 the bottom of which is engaged by a parts-pherical end 20 of the part 18. Brass collars 21, 22 are a loose fit on the part 18 and have radial clearance within the bore 19. The collars 21, 22 serve to locate a plurality of toroidal elastomeric rings 23 axially of the part 18. The rings 23 frictionally engage the part 18 and the inside of the bore 19.

A space defined within the bore 19 by the end 20 of the part 18 can communicate with the bore 12 of the gear 13 by way of passages 24 and a cavity 25 in the part 18.

In use, the torque required to drive the gear pump 14 is substantially higher than that required to drive the centrifugal pump 17. The circumferential force between the splines of the shaft 10 and bore 12 is sufficiently high as to inhibit relative movement between these parts. The bore 12 is normally filled with liquid at a relatively low pressure, delivered by the pump 17. During assembly it is ensured that the bore 19 and cavity 25 are filled with this liquid. Axial movement between the part 18 and shaft 15, and hence between the shaft 15 and gear 13 is restrained in part by frictional engagement of the rings 23 with these parts, and also by liquid flow through the restricted passages 24 which must necessarily accompany such axial movement. Relative rotation between the shaft 15 and part 18 is prevented by the frictional engagement of the rings 23, the torque resulting from this engagement being sufficient to prevent backlash movement. Inclination of the axis of the shaft 15 to that of the gear 13 is opposed by elastic compression of the rings 23, this compression also opposing relative radial movement between the shaft 15 and the part 18.

I claim:

1. A spline drive arrangement including an internally splined member in driving engagement with first and second axially aligned externally splined members, an axial projection on said first member, an axial bore in said second member, said bore surrounding said projection, an annular elastomeric element surrounding said projection and frictionally engaging said projection and said bore, and means for locating said elastomeric element axially with respect to said first member, said locating means comprising two axially spaced annular parts on said projection, said elastomeric element being located between said annular parts.

2. An arrangement as claimed in claim 1 in which the free end of said axial projection and the adjacent end of said bore define a space within said second member, in which there is provided means for maintaining said space full of a liquid, and flow restricting means through which said liquid can enter and leave said space.

3. An arrangement as claimed in claim 1 in which said annular parts comprise collars which are a loose fit on said projection and have radial clearance within said bore.

* * * * *